(12) United States Patent
Saiki et al.

(10) Patent No.: US 11,657,342 B2
(45) Date of Patent: May 23, 2023

(54) WORK SELECTION SYSTEM AND WORK SELECTION METHOD

(71) Applicant: KOBELCO CONSTRUCTION MACHINERY CO., LTD., Hiroshima (JP)

(72) Inventors: Seiji Saiki, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 430 days.

(21) Appl. No.: 17/045,324

(22) PCT Filed: Apr. 3, 2019

(86) PCT No.: PCT/JP2019/014852
§ 371 (c)(1),
(2) Date: Oct. 5, 2020

(87) PCT Pub. No.: WO2019/202996
PCT Pub. Date: Oct. 24, 2019

(65) Prior Publication Data
US 2021/0073711 A1    Mar. 11, 2021

(30) Foreign Application Priority Data

Apr. 20, 2018    (JP) .............................. JP2018-081297

(51) Int. Cl.
*G06Q 50/08*    (2012.01)
*H04L 67/12*    (2022.01)
(Continued)

(52) U.S. Cl.
CPC ... *G06Q 10/063112* (2013.01); *G05D 1/0276* (2013.01); *G06F 3/04842* (2013.01);
(Continued)

(58) Field of Classification Search
CPC ......... G06Q 10/063112; G06Q 10/103; G06Q 10/105; G06Q 30/0637; G06Q 50/08;
(Continued)

(56) References Cited

U.S. PATENT DOCUMENTS

2013/0117682 A1 *  5/2013  Fukasawa .......... H04N 1/00222
                                                              715/740
2015/0286979 A1    10/2015  Ming et al.
(Continued)

FOREIGN PATENT DOCUMENTS

JP    2002-108975 A    4/2002
JP    2003-132003 A    5/2003
(Continued)

OTHER PUBLICATIONS

Egawa et al. (Use of Construction Machinery in Earthquake Recovery Work, published 2013, pp. 1-6) (Year: 2013).*
(Continued)

*Primary Examiner* — Shahid K Khan
*Assistant Examiner* — Ahamed I Nazar
(74) *Attorney, Agent, or Firm* — Oblon, McClelland, Maier & Neustadt, L.L.P.

(57) ABSTRACT

A server includes: a communication part which receives from an orderer terminal operation request information input by an orderer and including a specific operation content and an operation time set for the specific operation content; and a display data generation part which generates based on the operation request information display data on which a master device displays an operation selection image showing the operation content and the operation time set in combination with each other to allow a selection of a desired time segment of the operation time set. The master device includes: a display control part which generates the operation selection image based on the display data so that a (Continued)

display part displays the operation selection image; and an operation part which receives a selection instruction of the operator that the operator selects the desired time segment of the operation time set shown in the operation selection image.

9 Claims, 14 Drawing Sheets

(51) Int. Cl.
  *G06F 3/04842*  (2022.01)
  *G06Q 10/0631*  (2023.01)
  *G05D 1/02*  (2020.01)
  *G06Q 10/10*  (2023.01)
  *G06Q 10/105*  (2023.01)
  *G06Q 30/0601*  (2023.01)

(52) U.S. Cl.
  CPC ......... *G06Q 10/103* (2013.01); *G06Q 10/105* (2013.01); *G06Q 30/0637* (2013.01); *G06Q 50/08* (2013.01); *H04L 67/12* (2013.01)

(58) Field of Classification Search
  CPC ....... G06Q 10/063118; G06Q 10/0639; G06Q 10/08; G05D 1/0276; G06F 3/04842; H04L 67/12
  See application file for complete search history.

(56) References Cited

U.S. PATENT DOCUMENTS

| | | | | |
|---|---|---|---|---|
| 2018/0069721 | A1* | 3/2018 | Ha | D06F 34/05 |
| 2018/0218301 | A1* | 8/2018 | Shike | G06Q 30/0645 |
| 2018/0284760 | A1* | 10/2018 | Gupta | B25J 13/065 |

FOREIGN PATENT DOCUMENTS

| | | |
|---|---|---|
| JP | 2005-222333 A | 8/2005 |
| JP | 2014-235658 A | 12/2014 |
| JP | 2016-71 904 A | 5/2016 |
| JP | 2016-85624 A | 5/2016 |

OTHER PUBLICATIONS

JP4203465B2—Work start availability information providing system and work start availability information providing program—Google Patents (Year: 2004).*

JP5608576B2—Work order management system and work order management method—Google Patents (Year: 2014).*

European Office Action dated Jul. 5, 2022 in European Patent Application No. 19 787 638.6, 11 pages.

Tanaka et al., "Development of a portable teleoperated robot for the manipulation of backhoe shovel for the restoration of disaster-stricken sites", Algorithms and Technologies for Multispectral, Hyperspectral, and Ultraspectral Imagery XIX—Proceedings of SPIE, vol. 3840, 1999, pp. 125-132, XP055927775 (9 total pages).

Extended European Search Report dated Mar. 24, 2021 in corresponding European Patent Application No. 19787836.6, 8 pages.

Abid C. et al.: "Collaborative Order Management in Distributed Manufacturing", International Journal of Production Research, vol. 42. No. 2, XP055786248, Jan. 15, 2004, pp. 283-302 ISSN: 0020-7543. DOI: 10.1080/00207540310001602919 Retrieved from the Internet: URL:https://www.tandfonline.com/doi/pdf/10.1080/00207540310001602919?needAccess=true.

International Search Report dated Jun. 25, 2019 in PCT/JP2019/014852 filed on Apr. 3, 2019, 2 pages \* cited by examiner

FIG.2

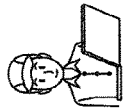 INPUT BY ORDERER

INPUT OF OPERATION TIME SET AND REMUNERATION (CONSTRUCTION WORK)

H1

| SITE NAME | MACHINE INFORMATION | | |
|---|---|---|---|
| | MACHINE TYPE | MACHINE MODEL | ATT | LEADING END ATT |
| SITE A | BACKHOE | SK 200-10 | STANDARD BUCKET | |

H2

| OPERATION CONTENT | REQUIRED SKILL LEVEL | |
|---|---|---|
| | LUMP-SUM PAYMENT | HOURLY WAGE |
| EXCAVATION AND LOADING | C | D |
| FLAT GROUND PREPARATION | B | C |
| FLAT GROUND FORMING | A | B |
| SLOPE PREPARATION | S | A |
| SLOPE FORMING | S | S |

H3

APRIL 3, 2021 (OPERATION TIME SET)

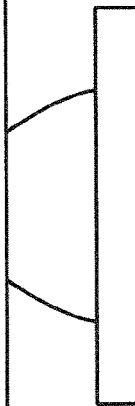

| EVALUATION SCORE | RANK |
|---|---|
| 401 OR HIGHER | S |
| 301~400 | A |
| 201~300 | B |
| 101~200 | C |
| 0~100 | D |

FIG.4

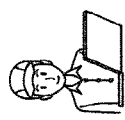
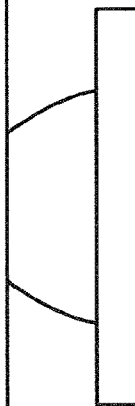

INPUT BY ORDERER

INPUT OF OPERATION TIME SET AND REMUNERATION (DEMOLITION WORK)

H1

| SITE NAME | MACHINE INFORMATION | | |
|---|---|---|---|
| | MACHINE TYPE | MACHINE MODEL | ATT | LEADING END ATT |
| SITE C | DEMOLISHER | SK 500-10 | THREE-FOLDED | LARGE NIBBLER |

H2

| OPERATION CONTENT | REQUIRED SKILL LEVEL | |
|---|---|---|
| | LUMP-SUM PAYMENT | HOURLY WAGE |
| RABBLE LOADING | C | D |
| SMALL CUT | B | C |
| WOODEN BUILDING DEMOLITION | A | B |
| BUILDING DEMOLITION (LESS THAN 6m) | S | A |
| BUILDING DEMOLITION (6m OR HIGHER) | S | S |

H3

APRIL 3, 2021 (OPERATION TIME SET)

FIG.5

H1 - Machine Information

| SITE NAME | MACHINE INFORMATION | | |
|---|---|---|---|
| | MACHINE TYPE | MACHINE MODEL | ATT | LEADING END ATT |
| SITE A | BACKHOE | SK 200-10 | STANDARD BUCKET | |

H3 - April 3, 2021 (Operation Time Set)

| OPERATION CONTENT | REQUIRED SKILL LEVEL | REMUNERATION (JPY) |
|---|---|---|
| EXCAVATION AND LOADING | C / D | LUMP-SUM PAYMENT 14,400 / HOURLY WAGE 2,000 |
| FLAT GROUND PREPARATION | B / C | LUMP-SUM PAYMENT 16,560 / HOURLY WAGE 2,300 |
| FLAT GROUND FORMING | A / B | LUMP-SUM PAYMENT 15,000 / HOURLY WAGE 2,500 |
| SLOPE PREPARATION | S / A | LUMP-SUM PAYMENT 13,440 / HOURLY WAGE 2,800 |
| SLOPE FORMING | S / S | LUMP-SUM PAYMENT 10,800 / HOURLY WAGE 3,000 |

Time slots: 1:00 – 24:00

| OPERATOR ID | NAME | COUNTRY | COMMUNICATION ADDRESS | PASSWORD |
|---|---|---|---|---|
| XXXXX-XX | | | | |
| XXXXX-XX | | | | |
| XXXXX-XX | | | | |

・・・

T2

| MACHINE WEIGHT RANGE | ATT TYPE | LEADING ATT TYPE | SKILL LEVEL |
|---|---|---|---|
| 3t〜5t | STANDARD | BUCKET | S |
| 6t〜13t | STANDARD | BUCKET | A |
| 3t〜5t | LONG-RANGED | BUCKET | A |

ACTUAL OPERATION PERFORMANCE DB
"MACHINE WEIGHT RANGE: 3t –5t" × "ATT TYPE: STANDARD" × "LEADING END ATT TYPE: BUCKET"

| OPERATION CONTENT | BASE POINT | × | OPERATION TIME PERIOD(HR) | = | EVALUATION SCORE |
|---|---|---|---|---|---|
| EXCAVATION AND LOADING | 1 | × | 60 | = | 60 |
| FLAT GROUND PREPARATION | 2 | × | 10 | = | 20 |
| FLAT GROUND FORMING | 3 | × | 20 | = | 60 |
| SLOPE PREPARATION | 3 | × | 15 | = | 45 |
| SLOPE FORMING | 5 | × | 45 | = | 225 |

AUTOMATICALLY INPUT IN ACCORDANCE WITH ACTUAL PERFORMANCE

FIG.9

| MACHINE WEIGHT RANGE ⌐H141 | ATT TYPE ⌐H142 | LEADING END ATT TYPE ⌐H143 |
|---|---|---|
| 3t~5t | STANDARD | BUCKET |
| 6t~13t | LONG-RANGED | ROTATABLE GRAPPLE |
| 14t~26t | SEPARATED | MECHANICAL GRAPPLE |
| 27t~50t | THREE-FOLDED | SMALL NIBBLER |
| 50t OR HEAVIER | SHORT-ARMED | LARGE NIBBLER |

ACTUAL SIMULATOR PERFORMANCE DB

| OPERATION CONTENT | BASE POINT | × | OPERATION TIME PERIOD(HR) | = | EVALUATION SCORE |
|---|---|---|---|---|---|
| EXCAVATION AND LOADING | 1 | × | 82 | = | 82 |
| FLAT GROUND PREPARATION | 2 | × | 27 | = | 54 |
| FLAT GROUND FORMING | 3 | × | 15 | = | 45 |
| SLOPE PREPARATION | 3 | × | 8 | = | 24 |
| SLOPE FORMING | 5 | × | 14 | = | 70 |

AUTOMATICALLY INPUT IN ACCORDANCE WITH ACTUAL PERFORMANCE

ACTUAL EXAMINATION PERFORMANCE DB

| EXAMINATION CONTENT | BASE POINT | × | JUDGMENT RESULT | = | EVALUATION SCORE |
|---|---|---|---|---|---|
| EXCAVATION AND LOADING | 50 | × | 1 | = | 50 |
| FLAT GROUND PREPARATION | 100 | × | 1 | = | 150 |
| FLAT GROUND FORMING | 150 | × | 0 | = | 0 |

AUTOMATICALLY INPUT IN ACCORDANCE WITH ACTUAL PERFORMANCE

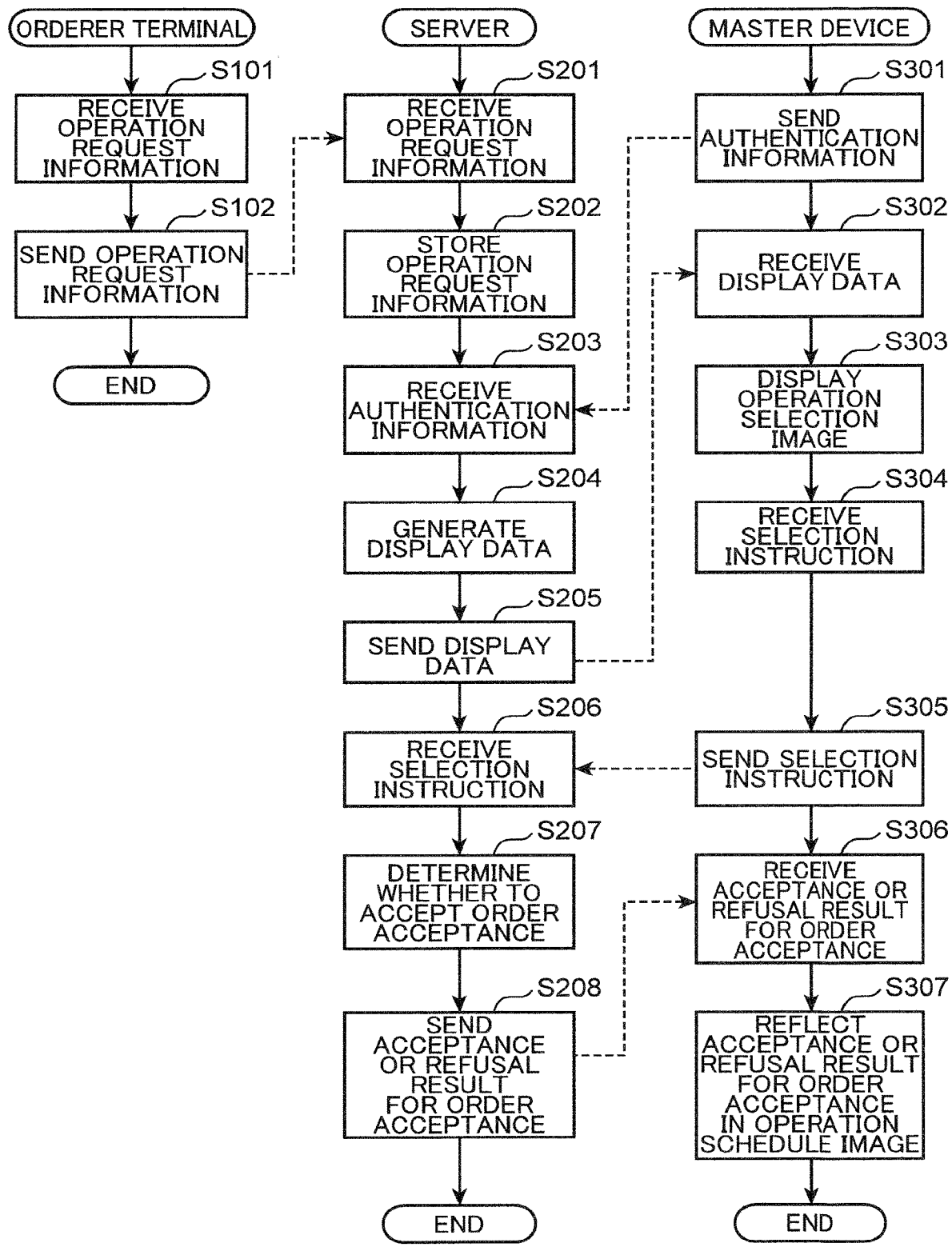

WORK SELECTION SYSTEM AND WORK SELECTION METHOD

TECHNICAL FIELD

The present invention relates to a technology for allowing an operator to select an operation ordered by an orderer to an operator.

BACKGROUND ART

It has recently been more and more difficult for orderers to ensure sufficient operators of construction machines due to a serious shortage of the operators in accordance with their aging. Under the circumstances, expectations for remote manipulation systems have been increasing to permit an operator to remotely manipulate a construction machine without visiting a work site.

Such a remote manipulation system can collect operators from foreign countries in addition to all over the regions in a certain country, and makes it easier for an orderer to ensure sufficient operators. Moreover, the remote manipulation system eliminates the necessity for each operator to visit the work site. With the remote manipulation system, the operator can adopt a work style of changing work sites depending on a desired time segment, e.g., performing an operation on one work site for a desired time segment and another operation on another work site for a subsequent time segment.

However, no technology has conventionally met a demand of an operator for a selection of a preferable operation for a desired time segment among operations ordered by an orderer and presented before the operator. Accordingly, there is a problem that the operator has a small permissible range of selectivity in selecting an operation.

Patent Literature 1 merely discloses a construction quantity management system for calculating productivity of each of operation teams for a construction work based on their machine information, operator information, operation time set, and actual construction quantity. Hence, Patent Literature 1 cannot solve the aforementioned problem.

CITATION LIST

Patent Literature

Patent Literature 1: Japanese Unexamined Patent Publication No. 2002-108975

SUMMARY OF INVENTION

An object of the present invention is to provide an operation selection system or the like which can increase a permissible range of selectivity for an operator in selecting an operation ordered by an orderer.

An operation selection system according to one aspect of the prevent invention includes: a remote manipulating device for remotely manipulating a construction machine; an orderer terminal for permitting an orderer to place an operation order to an operator of the remote manipulating device; and a server communicatively connected with the remote manipulating device and the orderer terminal, wherein the server includes: a first communication part which receives from the orderer terminal operation request information input by the orderer and including a specific operation content and an operation time set for the specific operation content; and a display data generation part which generates based on the operation request information display data on which the remote manipulating device displays an operation selection image showing the operation content and the operation time set in combination with each other to allow a selection of a desired time segment of the operation time set, and transmits the generated display data to the remote manipulating device via the first communication part, and the remote manipulating device includes: a second communication part which receives the display data; a display control part which generates the operation selection image based on the display data so that a display part displays the operation selection image; and an operation part which receives a selection instruction that the operator selects the desired time segment of the operation time set shown in the operation selection image, the second communication part being configured to transmit the selection instruction to the server, wherein the server further includes an order acceptance management part which receives an order acceptance of the operator for the desired time segment for the specific operation content indicated by the selection instruction.

This configuration permits an operator having a skill level equal to or higher than a required skill level to do an order acceptance of an ordered operation concerning a specification of a construction machine for use in the ordered operation.

BRIEF DESCRIPTION OF DRAWINGS

FIG. 2 shows an exemplary operation content input screen image concerning a construction work to be displayed on an orderer terminal when an orderer places an operation order to an operator.

FIG. 4 shows an exemplary operation content input screen image concerning a demolition work to be displayed on the orderer terminal when the orderer places an operation order to the operator.

FIG. 5 shows an exemplary final screen image to be displayed on the orderer terminal when the orderer finishes an input of an operation content.

FIG. 6 shows an exemplary display image displayed on a master device when the operator performs a selection of an operation for an order acceptance.

FIG. 7 shows a configuration of an operator database.

FIG. 8 shows a configuration of an actual operation performance database.

FIG. 9 shows tables each listing machine weight ranges, ATT types, and leading end ATT types.

FIG. 10 shows a configuration of an actual simulator performance database.

FIG. 11 shows a configuration of an actual examination performance database.

FIG. 14 is a flowchart showing a processing of an operation selection system according to the embodiment of the present invention.

DESCRIPTION OF EMBODIMENTS

Figure 1:
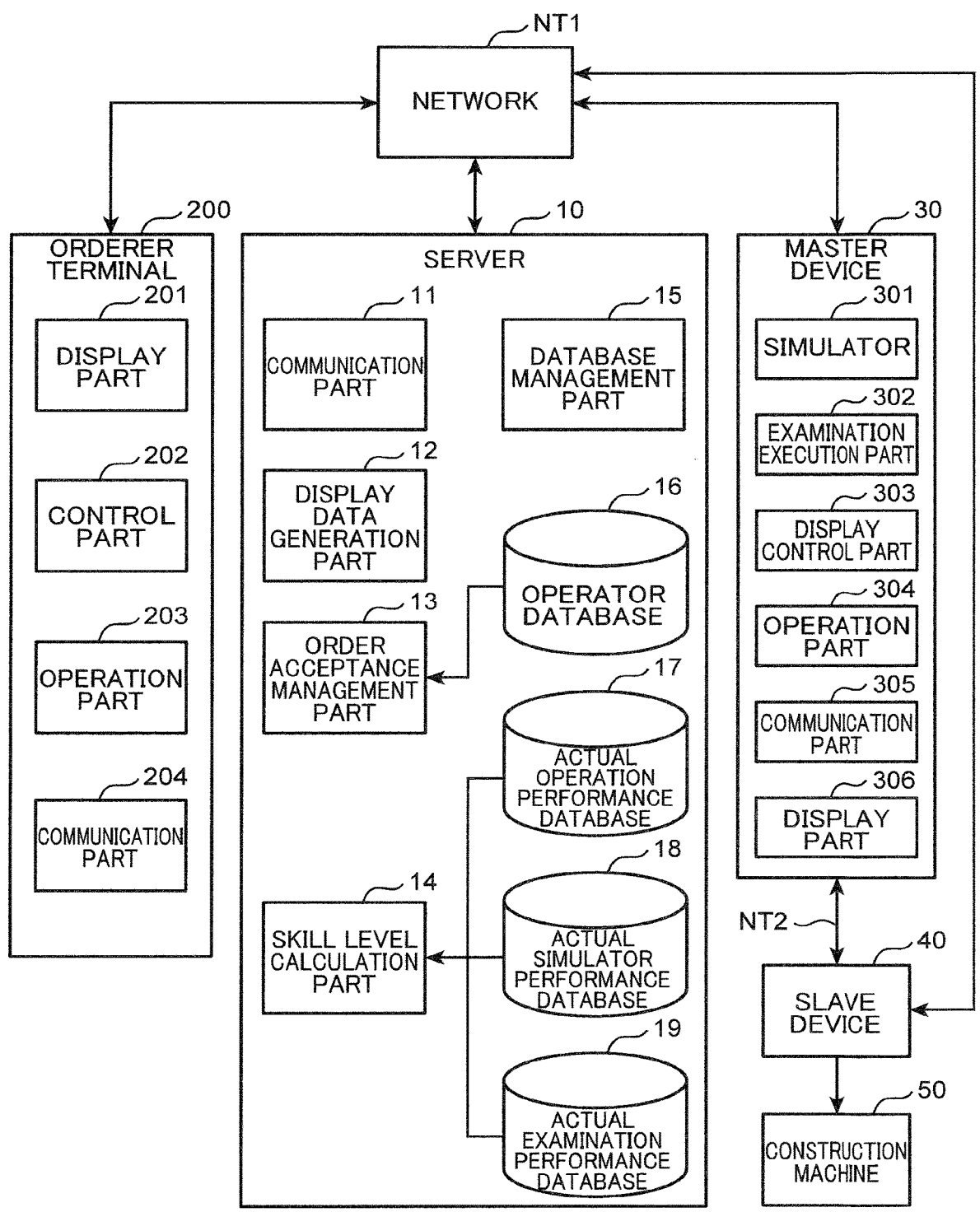
FIG. 1 is a block diagram showing an overall configuration of a operation selection system according to an embodiment of the present invention.

FIG. 1 is a block diagram showing a operation selection system according to an embodiment of the present invention. The operation selection system includes a server 10, an orderer terminal 200, and a master device 30. The orderer terminal 200 is a device for causing an orderer to place an operation order to an operator of the master device 30. The server 10 is a device for presenting the operation ordered by the orderer before the operator.

The master device 30 is an exemplary remote manipulating device for remotely manipulating a construction machine 50. In the embodiment, the master device 30 is a manipulating device imitating an operating seat device of the construction machine 50, and includes an operation lever corresponding to that of the construction machine 50 at the same position as in the construction machine 50. Besides, the master device 30 further includes a seat on which the operator sits, and a display part 306 arranged in front of the seat for displaying a peripheral image of the construction machine 50. The operator remotely manipulates the construction machine 50 by using the operation lever while seeing the peripheral image displayed on the display part 306.

A slave device 40 is a subordinate operating device arranged at the operating seat device of the construction machine 50, and directly operating the operation lever arranged at the operating seat device of the construction machine 50 based on a manipulative amount received by the master device 30. The slave device 40 serves as a dunny of the operator and operates the construction machine. The construction machine 50 includes a hydraulic excavator, a hydraulic crane, and the like to be remotely manipulated.

The server 10, the orderer terminal 200, the master device 30, and the slave device 40 are communicatively connected with one another via a network NT1. The network NT1 can include a long-distance communication network formed of Internet, a mobile phone communication network or the like.

The master device 30 and the slave device 40 are communicatively connected with each other via a communication channel NT2. The communication channel NT2 includes a communication channel, such as a specified low power radio and Bluetooth (registered trademark), which enables the master device 30 and the slave device 40 to communicate with each other at a distance of several tens to hundreds of meters therebetween. However, the communication channel is a mere example. The master device 30 and the slave device 40 may be connected with each other via the network NT instead. In this case, the master device 30 and the slave device 40 can establish a long-distance communication therebetween. Alternatively, a cable is adoptable for the communication channel NT2.

The orderer terminal 200 includes a computer such as a personal computer owned by the orderer who places the operation order to the operator. The orderer is a person who makes a schedule of a work such as a construction work, and places an operation order to the operator. The orderer is, for example, a worker belonging to a work order placement company. The operator may be an employee employed by a work order acceptance company, or may be self-employed without being directly employed by the work order acceptance company.

The orderer terminal 200 includes a display part 201, a control part 202, an operation part 203, and a communication part 204. The display part 201 includes, for example, a liquid crystal display. The control part 202 includes, for example, a processor such as a CPU, and controls the entirety of the orderer terminal 200. The operation part 203 includes, for example, a keyboard and a mouse, and receives an input of operation request information from the orderer. The communication part 204 includes a communicator which connects the orderer terminal 200 and the network NT1 with each other, and transmits the operation request information received by the operation part 203 to the server 10 via the network NT1.

FIG. 2 shows an exemplary operation content input screen image G1 concerning a construction work to be displayed on a the orderer terminal 200 when the orderer places an operation order to the operator. The operation content input screen image G1 includes a machine information input section H1, a required skill level input section H2, and an operation schedule input section H3.

The machine information input section H1 receives from the orderer an input of information concerning the construction machine 50 to be remotely manipulated for the ordered operation. Specifically, the machine information input section H1 includes columns of "SITE NAME" and "MACHIN INFORMATION". The column "SITE NAME" receives an input of a name of a site where the ordered operation is performed. The column "MACHINE INFORMATION" receives an input of parameters concerning a specification of the construction machine 50 to be remotely manipulated. The column "MACHINE INFORMATION" includes sub-columns of "MACHINE TYPE", "MACHINE MODEL", "ATT", and "LEADING END ATT". The sub-column "MACHINE TYPE" receives an input of a type of the construction machine 50 such as a backhoe, a mini-backhoe, a power excavator, a crane and the like. FIG. 2 shows an exemplary input of "BACKHOE". The sub-column "MACHINE MODEL" receives an input of a model number of the construction machine 50, such as "SK-200-10" and the like. The sub-column "ATT" receives an input of a type of an attachment of the construction machine 50, such as "STANDARD", "LONG ARMED" and the like. For instance, the attachment of the "STANDARD" type includes a boom and an arm. The sub-column "LEADING END ATT" receives an input of a type of a leading end attachment attached to a leading end of the attachment, such as "BUCKET", "NIBBLER" and the like.

The required skill level input section H2 receives an input of a required skill level required by the orderer for the operator to execute each of operation contents. The operation content input screen image G1 concerning the construction work has registration of five operation contents of "EXCAVATION AND LOADING", "FLAT GROUND PREPARATION", "FLAT GROUND FORMING", "SLOPE PREPARATION", and "SLOPE FORMING" in the required skill level input section H2.

The operation content "EXCAVATION AND LOADING" represents excavation of soil, ground, bedrock and the like, and loading the excavated ones onto a dump truck. The operation content "FLAT GROUND PREPARATION" represents preparation of the flat ground formed by way of "FLAT GROUND FORMING". The operation content "FLAT GROUND FORMING" represents formation of the flat ground by removing unevenness of the ground. The operation content "SLOPE PREPARATION" represents preparation of a slope formed by way of "SLOPE FORMING". The operation content "SLOPE FORMING" represents formation of the slope which is artificially made by removing the soil from the ground or adding the soil to the ground. The operation contents listed in FIG. 2 are mere examples, and thus may include other operation contents.

The column "REQUIRED SKILL LEVEL" includes sub-columns of "LUMP-SUM PAYMENT" and "HOURLY WAGE". The sub-column "LUMP-SUM PAYMENT" receives an input of a required skill level required by the orderer for the operator who chooses an order acceptance way under "LUMP-SUM PAYMENT". The way under "LUMP-SUM PAYMENT" represents an order acceptance way where the operator accepts the operation order in a lump for an entirety of an operation time set designated by the orderer for each of the operation contents.

The sub-column "HOURLY WAGE" receives an input of a required skill level required by the orderer for the operator who chooses another order acceptance way under "HOURLY WAGE". The way under "HOURLY WAGE" represents another order acceptance way where the operator partially accepts the operation order for a part of the operation time set designated by the orderer for each of the operation contents. Hereinafter, the former order acceptance way where the operator accepts the operation order in a lump for the entirety of the operation time period is referred to as a "lump order acceptance", and the latter order acceptance way where the operator partially accepts the operation order for a part of the operation time is referred to as a "partial order acceptance".

In the embodiment, a skill level of the operator is determined in accordance with five ranks of skill levels in the descending order of S, A, B, C, and D as shown in a rank determination table T3. The orderer sequentially inputs a required skill level in accordance with the ranks determined in FIG. 3.

Figure 3:
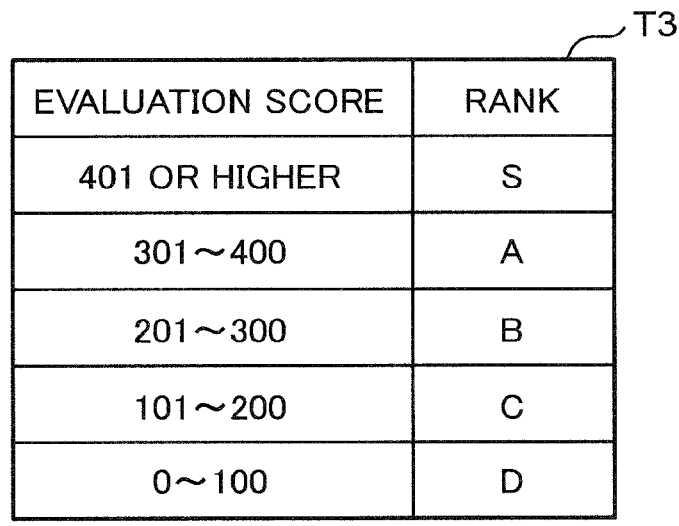
FIG. 3 shows an exemplary rank determination table.

FIG. 3 shows the exemplary rank determination table T3. The rank determination table T3 is stored in a memory of the server 10 in advance, and includes columns of "EVALUATION SCORE" and "RANK". In the example in FIG. 3, the five ranks of skill levels are determined in the descending order of S, A, B, C, and D. Therefore, the rank determination table T3 has registration of ranks S to D in this order in the column "RANK", and an evaluation score range for each of the ranks S to D in the column "EVALUATION SCORE". The evaluation score is used by a skill level calculation part 14 to be described later for determining the skill level of the operator with reference to an actual operation performance and the like of the operator.

The exemplary required skill level input section H2 shown in FIG. 2 receives an input of the required skill level ranked "C" for the lump-sum payment and an input of the required skill level ranked "D" for the hourly wage for "EXCAVATION AND LOADING". It is seen from this perspective that the required skill level under the lump order acceptance is generally higher than that under the partial order acceptance. This is because it would be more difficult to collect a large number of operators at a higher required skill level under the partial order acceptance, resulting in an increased possibility that the operation time set in combination with the corresponding operation content would have one or more time segments for which the operation order has been unaccepted.

However, the aforementioned ranking way is a mere example. Both the lump order acceptance and the partial order acceptance may be ranked at the same required skill level, like the rank "S" input for both the lump order recaption and the partial order reception for "SLOPE FORMING" as shown in FIG. 2. Alternatively, the partial order acceptance may be ranked at a higher required skill level than that of the lump order acceptance. In this manner, the orderer may preferably decide the required skill level under each of the lump order acceptance and the partial order acceptance.

The operation schedule input section H3 receives from the orderer an input of the operation time set for each of the operation contents in the corresponding operation row. The operation schedule input section H3 includes columns of "SITE NAME", "MACHINE INFORMATION", "OPERATION CONTENT", "REQUIRED SKILL LEVEL", "REMUNERATION", and "OPERATION TIME SET" with the title "Apr. 3, 2021". The columns "SITE NAME" and "MACHINE INFORMATION" directly reflect the information input in the machine information input section H1. The column "OPERATION CONTENT" directly reflects the operation contents listed in the required skill level input section H2. The column "REQUIRED SKILL LEVEL" directly reflects the required skill levels input in the sub-columns "LUMP-SUM PAYMENT" and "HOURLY WAGE" for each of the operation contents listed in the required skill level input section H2. The column "REMUNERATION" receives an input of a remuneration for each of the operation contents to be given to the operator by the orderer. In the embodiment, the orderer can input a remuneration in the column "REMUNERATION" for each of the "LUMP-SUM PAYMENT" and "HOURLY WAGE", independently.

In the example in FIG. 5, the remuneration "JPY 14,400" is input for "LUMP-SUM PAYMENT", and the remuneration "JPY 2,000" is input for "HOURLY WAGE" for "EXCAVATION AND LOADING". Here, a conversion of the remuneration under "LUMP-SUM PAYMENT" into that on an hourly basis in accordance with the operation time set of "six time segments" for "EXCAVATION AND LOADING" results in "JPY 2,400" that is higher than the remuneration under "HOURLY WAGE". Such a lump order acceptance of the operation content for the entirety of the time set by the operator alone is convenient for the orderer in terms of reduction in the burden of operation schedule management. Therefore, in the example in FIG. 5, the remuneration for the lump order acceptance is higher than the remuneration for the partial order acceptance to motivate the operator to choose the lump order acceptance.

Referring back to FIG. 2, the column "OPERATION TIME SET" receives an input of an operation time set on a day for each of the operation contents to be executed on a site whose name (here, "SITE A") is input in the column "SITE NAME". In this case, the column "OPERATION TIME SET" is displayed with the title "Apr. 3, 2021" for an input of each operation time set on Apr. 3, 2021. In a case that a schedule for the work on the site A consists of a plurality of days, a switch button may be provided on the operation content input screen image G1 for displaying another column "OPERATION TIME SET" on another day.

The column "OPERATION TIME SET" is formed of a two-dimensional table defined by horizontally extending time axes and vertically extending operation content axes. Specifically, the column "OPERATION TIME SET" is partitioned in a grid shape by a plurality of vertical lines dividing 24 hours into hourly-basis time segments, and a plurality of horizontal lines dividing the work into types of the operation contents. The column "OPERATION TIME SET" consists of 120 cells=24 hours×5 rows.

The orderer sequentially selects a desired time segment by a selection of a cell corresponding to the time segment of the operation time set through an inputting action (e.g., clicking and dragging). For example, the orderer performs the inputting action of selecting four cells from 9:00 to 12:00 in the first row for a selection of the time segments from 9:00 to 12:00 for "EXCAVATION AND LOADING". For display of the selected cells, a first color (e.g., white) indicating a default is changed to a second color different from the first color to indicate the selection. In this way, the orderer can easily confirm the selected time segments. The column "OPERATION TIME SET" in this configuration includes the time segments selectable on an hourly basis. However, this is a mere example, and the operation time set may include the time segments selectable on a desired time basis, e.g., 30 minutes, 10 minutes, two hours, three hours or the like.

In a case that the construction machine 50 is remotely manipulated to proceed with the work, the orderer can collect operators from all over the world. Hence, it is possible to continuously proceed with the work for 24 hours by, for example, causing one operator in a certain country to remotely manipulate the construction machine 50 during daytime, and another operator in a foreign country to remotely manipulate the construction machine 50 during nighttime. For this purpose, each of the time axes in the column "OPERATION TIME SET" defines 24-hour time segments from 1:00 to 24:00 thereon.

FIG. 4 shows an exemplary operation content input screen image G2 concerning a demolition work to be displayed on the orderer terminal 200 when the orderer places an operation order to the operator. The operation content input screen image G2 includes a machine information input section H1, a required skill level input section H2, and an operation schedule input section H3 in the same manner as the case of the construction work. However, the operation content input screen image G2 concerning the demolition work shows operation contents in connection with the demolition work, that is, "RUBBLE LOADING", "SMALL CUTTING", "WOODEN BUILDING DEMOLITION", "BUILDING DEMOLITION (LOWER THAN 6 m)", and "BUILDING DEMOLITION (6 m OR HIGHER)". Furthermore, the column "MACHINE INFORMATION" receives an input of parameters concerning a specification of a construction machine 50 for use in the demolition work. Specifically, the sub-column "MACHINE TYPE" receives an input of "DEMOLISHER", and the sub-column "LEADING END ATT" receives an input of "LARGE NIBBLER".

FIG. 5 shows an exemplary final screen image G3 to be displayed on the orderer terminal 200 when the orderer finishes the input of the operation contents. For instance, the final screen image G3 is displayed after the orderer finishes the input of all the information necessary for placing the operation order to the operation content input screen images G1, G2, and clicks an unillustrated confirmation button. In response to the clicking of the confirmation button, the orderer terminal 200 transmits the respective input information to the server 10 as the operation request information.

The final screen image G3 is the same as the operation content input screen images G1, G2 except no display of the required skill level input section H2.

It is seen from the example in FIG. 5 that the cells from 1:00 to 6:00 are displayed in the second color for "EXCAVATION AND LOADING", and thus the operation time set designated therefor is 1:00 to 6:00. Besides, the cells from 7:00 to 12:00 are displayed in the second color for "FLAT GROUND PREPARATION", and thus the operation time set designated therefor is 7:00 to 12:00. In the same manner, an operation time set is designated in combination with each of the remaining operation contents. A different color may be used in place of the second color for each of the operation contents.

It is further clear from the columns "REQUIRED SKILL LEVEL" and "REMUNERATION" that the remuneration is higher as the required skill level is higher. This configuration can motivate the operator to improve his/her skill level since such improvement in the skill level leads the operator to an order acceptance for an operation under a higher remuneration.

Referring back to FIG. 1, the server 10 is constituted by a computer including: a processor such as a CPU; a memory; and a communication function, and includes a communication part 11, a display data generation part 12, an order acceptance management part 13, the skill level calculation part 14, a database management part 15, an operator database 16, an actual operation performance database 17, an actual simulator performance database 18, and an actual examination performance database 19. The various databases shown in FIG. 2 are stored in a memory of the server 10. Moreover, in FIG. 1, each of the display data generation part 12 to the database management part 15 comes into effect, for example, when the CPU executes a corresponding program.

The communication part 11 (which is an exemplary "first communication part") includes, for example, a communicator which connects the server 10 and network NT1 with each other, and receives the operation request information sent from the orderer terminal 200.

The display data generation part 12 generates based on the operation request information received by the communication part 11 display data on which the master device 30 displays an operation selection image G51 (FIG. 6) showing the operation content and the operation time set in combination with each other to allow a selection of a desired time segment of the operation time set, and transmits the generated display data to the master device 30 via the communication part 11.

Figure 6:
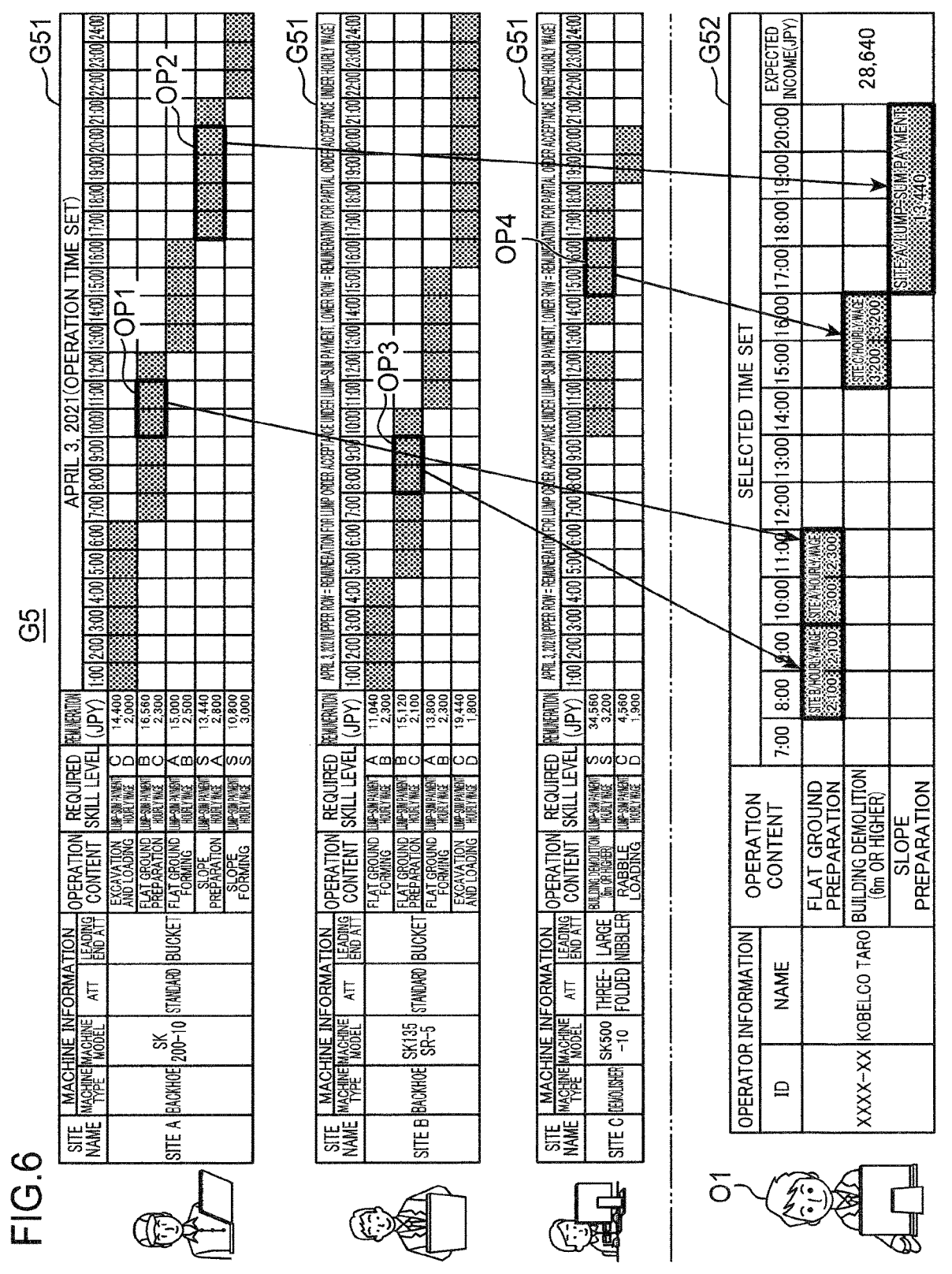

FIG. 6 shows an exemplary display image G5 to be displayed on the master device 30 when the operator performs a selection of an operation for an order acceptance. The display image G5 includes the operation selection image G51 and the operation schedule image G52. Here, three oderers place their respective operation orders for corresponding works on sites A, B, and C, and hence three operation selection images G51 therefor are displayed. The three orderers send their operation request information independently by using their respective orderer terminals 200.

Like the operation schedule input section 113 described with reference to FIGS. 2 and 4, each of the operation selection images G51 includes columns of "SITE NAME", "MACHINE INFORMATION", "OPERATION CONTENT", "REQUIRED SKILL LEVEL", "REMUNERATION", and "OPERATION TIME SET" with the title "Apr. 3, 2021". These columns directly reflect the information input by the orderer to the operation content input screen image G1, G2, and thus details of description therefor are omitted. Regarding the site A, the orderer designates an operation time set for each of the five operation contents of "EXCAVATION AND LOADING" to "SLOPE FORMING". Therefore, corresponding operation time sets for the five operation contents are displayed. Regarding the site B, the orderer designates no operation time set for each of "SLOPE PREPARATION" and "SLOPE FORMING". Accordingly, these two operation contents are excluded without being displayed.

Regarding the site C, the orderer places an operation order concerning a demolition work, and performs an input of two operation contents of "BUILDING DEMOLITION (6 m OR MORE)" and "RUBBLE LOADING". Therefore, corresponding operation time sets for the two operation contents are displayed.

The operation schedule image G52 shows one or more desired time segments selected by an operator O1 from a specific operation time set shown in the relevant operation selection image G51 and each of the operation contents in combination with each other. Specifically, the operation schedule image G52 includes columns of "OPERATOR INFORMATION", "OPERATION CONTENT", and "SELECTED TIME SET". The column "OPERATOR INFORMATION" shows an operator ID and a name of the operator O1. The column "OPERATION CONTENT" shows each of the operation contents for which one or more desired time segments are selected by the operator O1. However, the column "OPERATION CONTENT" excludes an operation content for which no time segment is selected by the operator O1. In this configuration, desired time segments are selected for the three operation contents of "FLAT GROUND PREPARATION", "BUILDING DEMOLITION (6 m OR HIGHER)", and "SLOPE PREPARATION", and thus these three operation contents are displayed.

The column "SELECTED TIME SET" is formed of a two-dimensional table partitioned by horizontally extending time axes and vertically extending operation content axes. The column "SELECTED TIME SET" is partitioned in a grid shape by a plurality of vertical lines dividing each of the time axes into hourly-basis segments and a plurality of horizontal lines dividing the work into the operation contents. Each of the time axes defining 7:00 to 20:00 in the embodiment is just an example, and thus may define 1:00 to 24:00 instead.

In the example in FIG. 6, the operator O1 uses an operation part 304 to perform an operative job OP1 of an input indicating a partial order acceptance for two time segments from 10:00 to 11:00 that are a part of the operation time set of six time segments from 7:00 to 12:00 for "FLAT GROUND PREPARATION" on the site A. In response, a display control part 303 of the master device 30 changes the first color to the second color for display of two cells corresponding to the two time segments from 10:00 to 11:00 for "FLAT GROUND PREPARATION" in the operation schedule image G52. Furthermore, the display control part 303 displays "SITE A" in each of the two cells to indicate that the time segments are selected for the site A. Additionally, the display control part 303 displays "2300" in each of the two cells under the hourly wage of JPY 2,300 for each of the time segments.

The operator O1 further uses the operation part 304 to perform an operative job OP2 of an input indicating a lump order acceptance for an entirety of the operation time set of four time segments from 17:00 to 20:00 for "SLOPE PREPARATION" on the site A. In response, the display control part 303 of the master device 30 merges four cells corresponding to the four time segments from 17:00 to 20:00 for "SLOPE PREPARATION" into a single cell, and changes the first color to the second color for display of the merged cell in the operation schedule image G52. Furthermore, the display control part 303 displays "SITE A" in the merged cell to indicate that the time segments are selected for the site A. Additionally, the display control part 303 displays "13,440" in the merged single cell under the remuneration of JPY 13,440 for the corresponding time set.

In response to other operative jobs OP3 and OP4, corresponding one or more selected time segments are shown in the operation schedule image G52 in the same manner as the operative jobs OP1, OP2.

The column "SELECTED TIME SET" includes a sub-column of "EXPECTED INCOME" for notifying the operator O1 of the sum of the remunerations. The sum of the remunerations for all the time segments selected through the operative jobs OP1 to OP 4 is JPY 28,640, and thus the sub-column "EXPECTED INCOME" shows "28,640".

As described above, in response to a selection of a desired time segment in the operation selection image G51, the operation schedule image G52 reflects the selected time segment. Hence, the operator O1 can make an operation schedule at his/her convenience while sequentially performing an inputting action of selecting a desired time segment of an operation time set for each of the operation contents to the operation selection image G51. Furthermore, both the operation selection image G51 and the operation schedule image G52 are displayed in juxtaposition on the display image G5. Thus, the operator O1 can easily confirm the selected time segments. Moreover, the operator O1 can make the operation schedule to achieve a target sum amount of income while checking each sum amount shown in the column "EXPECTED INCOME".

The operation selection image G51 shows the remunerations under the lump-sum payment and the hourly wage individually, and hence can provide the operator O1 with information for making a decision to choose the lump order acceptance or the partial order acceptance.

The operation selection image G51 further shows the required skill levels for the lump-sum payment and the hourly wage individually, and hence can provide the operator O1 with another information for making a decision to confirm whether his/her skill level satisfactorily meets the operation content.

The operator O1 clicks an unillustrated submit button after finishing the input to the operation schedule image G52. In response to the clicking, a communication part 305 of the master device 30 transmits the various information input to the operation schedule image G52 to the server 10 as a selection instruction. For instance, the selection instruction includes: one or more desired time segments selected by the operator O1 for each of the operation contents; the information indicating the lump order acceptance or the partial order acceptance for each of the time segments; and the operator ID.

Referring back to FIG. 1, the order acceptance management part 13 receives the order acceptance of the operator for the desired time segment contained in the selection instruction received by the communication part 11. Specifically, the order acceptance management part 13 acquires from the operator database 16 a skill level for one of a plurality of groups of parameters contained in the operation request information corresponding to the selection instruction when the communication part 11 receives the selection instruction. The order acceptance management part 13 then accepts the order acceptance of the operator for the desired time segment contained in the selection instruction in the case that the operator satisfies the condition of skill level equal to or higher than the required skill level under the lump order acceptance. Similarly, the order acceptance management part 13 accepts the order acceptance of the operator for the desired time segment contained in the selection instruction in the case that the operator satisfies the condition of skill level equal to or higher than the corresponding required skill level under the partial order acceptance.

Referring to FIG. 6, for example, the order acceptance management part 13 refuses to accept a lump order acceptance of an operator having the skill level ranked "D" for "EXCAVATION AND LOADING" on the site A since the required skill level for "EXCAVATION AND LOADING" under the lump order acceptance is ranked "C". Conversely, the order acceptance management part 13 accepts a partial acceptance of this operator for "EXCAVATION AND LOADING" on the site A since the required skill level for "EXCAVATION AND LOADING" under the partial acceptance is ranked "D".

The order acceptance management part 13 having finished the processing of determination on the order acceptance provides the communication part 11 with an acceptance or refusal result of the order acceptance, and the communication part 11 transmits the acceptance or refusal result to the master device 30. In this case, the master device 30 may rechange the second color to the first color for display of the sell corresponding to the time segment for which the order acceptance is refused, and may display a message notifying the refusal near the operation schedule image G52. Conversely, in a case that the order acceptance for all the time segments is accepted, the master device 30 may display a message notifying the acceptance of the order acceptance for all the time segments near the operation schedule image G52.

FIG. 7 shows a configuration of the operator database 16. The operator database 16 includes an operator table T1 and a skill level table T2. The operator table T1 has registration of individual information of operators entered in advance. The skill level table T2 exists for each of the entered operators.

Specifically, the operator table T1 includes columns of "OPERATOR ID" "NAME", "COUNTRY", "COMMUNICATION ADDRESS", and "PASSWORD". The column "OPERATOR ID" represents an identifier for uniquely identifying each of the entered operators. The column "NAME" represents the name of the operator. The column "COUNTRY" represents a country, such as Japan and Germany, where the operator lives. The column "COMMUNICATION ADDRESS" represents a communication address of the master device 30 used by the operator. The column "PASSWORD" represents a password required when the operator logs in the operation selection system.

The skill level table T2 includes columns of "MACHINE WEIGHT RANGE", "ATT TYPE", "LEADING END ATT TYPE", and "SKILL LEVEL". This table has registration of "SKILL LEVEL" of the operator in correspondence to a group of "MACHINE WEIGHT RANGE", "ATT TYPE", and "LEADING END ATT TYPE". Specifically, the skill level table T2 has registration of skill levels in correspondence to a plurality of groups each consisting of different parameters of a plurality of parameters concerning a specification of the construction machine 50. The column "MACHINE WEIGHT RANGE" represents a predetermined weight range of the construction machine 50, such as the range from 3 t to 5 t, the range from 6 t to 13 t and the like. The column "ATT TYPE" represents a predetermined attachment type, and the column "LEADING END ATT TYPE" represents a predetermined leading end attachment type.

The operator specified in the skill level table T2 in FIG. 7 has the skill level ranked "S" for the machine weight range of "3 t-5 t", the ATT type of "STANDARD", and the leading end ATT type of "BUCKET". Accordingly, the column "SKILL LEVEL" has registration of the rank "S" in the first record row.

In advance, each of the skill levels shown in FIG. 7 is calculated by the skill level calculation part 14 to be described later based on a past actual operation performance and the like of the operator, and registered in the skill level table T2.

Referring back to FIG. 1, the order acceptance management part 13 having accepted the order acceptance for the desired time segment contained in the selection instruction issues an access code for permitting the operator to perform the operation for the desired time segment. The communication part 11 transmits the access code to the master device 30 and the slave device 40.

The master device 30 and the slave device 40 having received the access code stores the access code in their respective memories (not shown). The operator is required to input the access code to perform the operation under the order acceptance by way of a remote manipulation using the master device 30. The master device 30 collates the access code input by the operator with the access code stored in the memory, and transmits the input access code to the slave device 40 after confirming that the access codes match each other. The slave device 40 collates the received access code with the access code stored in the memory, and transmits an access permission notification to the master device 30 after confirming that the access codes match each other. In this way, the operator can remotely manipulate the construction machine 50 by using the master device 30.

The access code may include an amount of characteristic about a face image of the operator. In this case, the master device 30 acquires the face image of the operator by using an unillustrated camera, extracts the amount of characteristic about the face image, and transmits the amount of characteristic to the slave device 40 after confirming that the transmitted amount of characteristic matches the amount of characteristic stored in the memory. The slave device 40 transmits the access permission notification to the master device 30 after confirming that the transmitted amount of characteristic matches the amount of characteristic stored in the memory. If the access code consists of a character string, other person may steel the character string and inputting the stolen character string to thereby perform the remote manipulation using the master device 30. In contrast, use of the access based on the amount of characteristic about the face image can prevent such an unauthorized other person from performing the remote operation.

Besides, the access code may be provided with a predetermined expiration term. The expiration term may include a finish date and time of the corresponding time segment. The setting of the expiration term can avoid a situation where the operator remotely manipulates the construction machine 50 used for the operation which has already been finished.

The skill level calculation part 14 calculates the skill level of each of the entered operators by calculating a sum total value of evaluation scores of the respective operation contents with reference to the actual operation performance database 17, the actual simulator performance database 18, and the actual examination performance database 19, and collating the calculated sum total value of the evaluation scores with the rank determination table T3, and registers the calculated skill level in the operator database 16.

Hereinafter, the calculation of the skill level will be described in detail. FIG. 8 shows a configuration of the actual operation performance database 17. The actual operation performance database 17 exists for each of the entered operators concerning each of groups of "MACHINE WEIGHT RANGE", "ATT TYPE", and "LEADING END ATT", and has registration of a corresponding past actual operation performance therefor. In the example in FIG. 7, the actual operation performance database 17 relates to a group of "MACHINE WEIGHT RANGE" of "3 t-5 t", "ATT TYPE" of "STANDARD", and "LEADING END ATT TYPE" of "BUCKET". If the relevant operator has another actual operation performance concerning a different group other than the group of "MACHINE WEIGHT RANGE" of "3 t-5 t", "ATT TYPE" of "STANDARD", and "LEADING END ATT TYPE" of "BUCKET", a corresponding actual operation performance database 17 in connection with the different group exists as well. Here, "ACTUAL OPERATION PERFORMANCE" represents an actual performance of the operator for each of operations ordered by the orderer and actually performed by the operator by way of the remote manipulation of the construction machine 50 on an actual work site.

FIG. 9 shows tables each listing the machine weight ranges, the ATT types, and the leading end ATT types. As shown in table H141, the weight ranges in the embodiment are divided into five ranges of "3t-5t", and "6t-13t" to "50t or HEAVIER". As shown in table H142, the ATT types in the embodiment are divided into five types of "STANDARD", "LONG-RANGED", "SEPARATED," "THREE-FOLDED", and "SHORT-ARMED". As shown in table H143 in the embodiment, the leading end ATT types are divided into five types of "BUCKET", "ROTATABLE GRAPPLE", "MECHANICAL GRAPPLE", "SMALL NIBBLER", and "LARGE NIBBLER".

For instance, in a case that a specific operator has an actual operation performance for a group of the machine weight range of "3 t-5 t", the ATT type of "STANDARD", and the leading end ATT type of "BUCKET", and another actual operation performance for another group of the machine weight range of "3 t-5 t", the ATT type of "LONG-RANGED", and the leading end ATT type of "BUCKET", two actual operation performance databases 17 exist in connection with the two groups.

Referring back to FIG. 8, the actual operation performance database 17 includes columns of "OPERATION CONTENT", "BASE POINT", "OPERATION TIME PERIOD", and "EVALUATION SCORE". The column "OPERATION CONTENT" has registration of the operation contents, specifically, five operation contents of "EXCAVATION AND LOADING", "FLAT GROUND PREPARATION", "FLAT GROUND FORMING", "SLOPE PREPARATION", and "SLOPE FORMING". The column "OPERATION TIME PERIOD" has registration of a cumulative operation time period for each of the operation contents concerning the corresponding operations actually performed by the operator.

The "BASE POINT" represents a predetermined coefficient to be multiplied by the operation time period input to the column "OPERATION TIME PERIOD". Here, the value of the base point is determined so that the base point is higher for the operation content with higher difficulty. The "EVALUATION SCORE" represents a numeric value of a product of the base point and the operation time period for each of the operation contents. A higher score means that the relevant operation is more difficult. Accordingly, the required skill level for the operator is increased as well.

Regarding the actual operation performance database 17, the skill level calculation part 14 calculates the evaluation score by multiplying the operation time period by the base point, and registers the calculated evaluation score in the column "EVALUATION SCORE" for each of the operation contents. FIG. 8 shows registration of five operation contents of "EXCAVATION AND LOADING" to "SLOPE FORMING" concerning the construction work. This is because the operator has the actual operation performance for each of the operation contents. For instance, if the operator has an actual operation performance concerning the demolition work, the operation contents concerning the demolition work are also registered. In this way, the actual operation performance database 17 has registration of the operation contents reflecting the actual operation performance and the cumulative value of the actual operation time period in combination with each other.

FIG. 10 shows a configuration of the actual simulator performance database 18. The actual simulator performance database 18 exists for each of the entered operators, and has registration of an actual performance of the operator having performed a training for the remote manipulation using a simulator 301 of the master device 30. The actual simulator performance database 18 includes columns of "OPERATION CONTENT", "BASE POINT", "OPERATION TIME PERIOD", and "EVALUATION SCORE". The column "OPERATION CONTENT" has registration of the operation contents for which the operator has performed the training by using the simulator 301. The column "OPERATION TIME PERIOD" has registration of a cumulative value of a training time period of the operator having performed the training by using the simulator 301 for each of the operation contents. The columns "BASE POINT" and "EVALUATION SCORE" are the same as those described with reference to FIG. 8.

Regarding the actual simulator performance database 18, the skill level calculation part 14 calculates the evaluation score by multiplying the operation time period by the base point, and registers the calculated score in the column "EVALUATION SCORE" for each of the operation contents. FIG. 8 shows registration of five operation contents of "EXCAVATION AND LOADING" to "SLOPE FORMING" concerning the construction work. This is because the operator has the actual training performance for each of the operation contents. As described above, the actual simulator performance database 18 has registration of the operation content reflecting the actual training performance, and the cumulative value of the actual training time period for the operation content, and the evaluation score for the operation content in combination with one another.

FIG. 11 shows a configuration of the actual examination performance database 19. The actual examination performance database 19 exists for each of the entered operators, and has registration of a judgment result of a predetermined examination executed for each of the operation contents. The examination is executed to ensure that the operator has a predetermined skill level or higher for a specific operation content.

The actual examination performance database 19 includes columns of "EXAMINATION CONTENT", "BASE POINT", "JUDGMENT RESULT", and "EVALUATION SCORE". The column "EXAMINATION CONTENT" has registration of operation contents for which corresponding examinations are executed. Here, an examination is executed for each of the three operation contents of "EXCAVATION AND LOADING", "FLAT GROUND PREPARATION", and "FLAT GROUND FORMING", and hence the column "EXAMINATION CONTENT" has registration of the three operation contents. The column "JUDGMENT RESULT" has registration of a judgment result of the examination. Passing is denoted by the numeral "1", and not-passing is denoted by the numeral "0". The columns "BASE POINT" and "EVALUATION SCORE" are the same as those described with reference to FIG. 8 except that each of the base points shown in FIG. 11 is 50 times as many as the relevant base point in FIGS. 8 and 10 in conformity with the scale of the corresponding evaluation score in the actual operation performance database 17 shown in FIG. 8 and the actual simulator performance database 18 shown in FIG. 10.

The skill level calculation part 14 calculates a total sum value of the evaluation scores of the respective operation contents in the actual operation performance database 17, the evaluation scores of the respective operation contents in the actual simulator performance database 18, and the evaluation scores of the respective operation contents in the actual examination performance database 19. For example, the sum value of the evaluation scores in the actual operation performance database 17 is 410 (=60+20+60+45+225), the sum value of the evaluation scores in the actual simulator performance database 18 is 275 (=82+54+45+24+70), and the sum value of the evaluation scores in the actual examination performance database 19 is 200 (=50+150). Therefore, a final sum total value of the evaluation scores calculated for the group of "MACHINE WEIGHT RANGE: 3 t-5 t", "ATT TYPE: STANDARD", and "LEADING END ATT TYPE: BUCKET" results in 885 (=410+275+200). It is understood from the rank determination table T3 that the final sum total value "858" is ranked "S". In this respect, the skill level calculation part 14 calculates the skill level of the operator as the rank "S" for the group of "MACHINE WEIGHT RANGE: 3 t-5 t", "ATT TYPE: STANDARD", and "LEADING END ATT TYPE: BUCKET". Moreover, if the operator has another actual operation performance for another group of "MACHINE WEIGHT RANGE", "ATT TYPE", and "LEADING END ATT TYPE", the skill level calculation part 14 calculates a total sum value of evaluation scores and calculates the skill level for the group.

It is sufficient that the skill level calculation part 14 executes the processing of calculating the skill level every time when one of the actual operation performance database 17, the actual simulator performance database 18, and the actual examination performance database 19 is updated, thereby updating the skill level registered in the operator database 16.

Referring back to FIG. 1, the database management part 15 manages the actual operation performance database 17, the actual simulator performance database 18, and the actual examination performance database 19.

Figure 12:
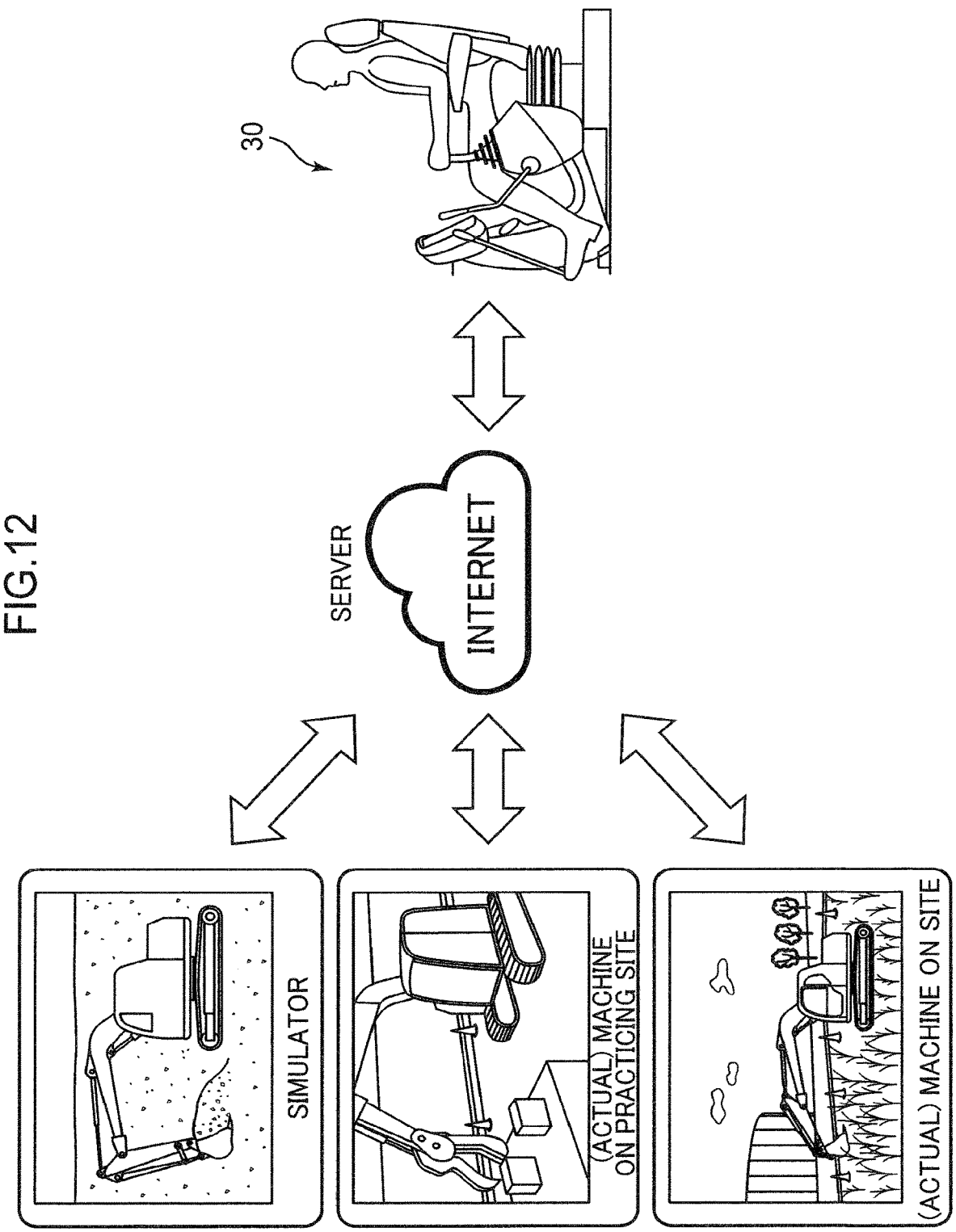
FIG. 12 schematically shows a processing executed by a database management part.

FIG. 12 schematically shows the processing executed by the database management part 15. The database management part 15 updates the actual simulator performance database 18 every time when acquiring an actual training performance using the simulator 301 (FIG. 1). The simulator 301 includes a computer program provided at the master device 30, and is executed by, for example, the operator in spare moments between actual operations with the aim of improving the skill level for the remote manipulation.

The simulator 301 establishes a virtual site environment formed of three-dimensional model and simulating an actual work site in a computer space, and a construction machine model simulating an actual construction machine is arranged in the virtual site environment. The simulator 301 generates an image of the virtual site environment visible from an operation seat of the construction machine model when the operator sits on a corresponding operation sheet, and causes the display part 306 of the master device 30 to display the generated image. The simulator 301 further changes a posture of each of an attachment, a leading end attachment, and an upper slewing body of the construction machine model in response to a manipulative operation by the operator using the operation lever of the master device 30, and further changes the image of the virtual site environment in accordance with the change in the posture. Besides, the simulator 301 puts the operation content such as the excavation and the loading into effect in the virtual site environment in the same manner as on the actual work site in response to the manipulative operation by the operator using the operation lever.

Upon activated, the simulator 301 causes the operator to select a specific operation content and execute the selected operation content in the virtual site environment, thereby training the operator. After finishing the training, the simulator 301 sends to the server 10 a simulation result including the operation content and a training time period therefor in combination with each other.

The database management part 15 having acquired the simulation result updates the actual simulator performance database 18 in accordance with the simulation result. In this manner, results of the simulation performance executed by the operator are accumulated as a history in the actual simulator performance database 18.

Further, in a case that the operator receives a judgment result of an examination for a specific operation content, the database management part 15 updates the actual examination performance database 19 in accordance with the judgment result. The examination is, for example, a test provided by a provider of the operation selection system. The operator can take the examination by activating an examination execution part 302 of the master device 30. For instance, the examination is executable under the condition that the operator manipulates an actual predetermined construction machine 50 arranged on an actual practicing site by using the master device 30.

For instance, the operator utilizes the master device 30 to activate the examination execution part 302, and performs an input thereto an examination request for taking an examination concerning a desired operation content. The examination request is sent to the server 10. The server 10 having received the examination request communicatively connects the slave device 40 mounted on the predetermined construction machine 50 on the practicing site and the master device 30 with each other to make the predetermined construction machine 50 remotely manipulative with use of the master device 30, and thereafter starts the examination. For instance, an examiner performs a judgment of the examination via remote or direct visual confirmation of the operation actually performed on the practicing site by way of the remote manipulation. After the examiner performs the judgment, a judgment result is sent from the terminal of the examiner to the server 10. The database management part 15 having received the judgment result updates the actual examination performance database 19 of the operator.

Consequently, the operator can take the examination after improving the skill level by satisfactorily practicing in the virtual site environment provided by the simulator 301.

Moreover, upon acquiring an actual operation performance for an actual operation, the database management part 15 updates the actual operation performance database 17 in accordance with the acquired actual operation performance. The actual operation performance includes information of an operational amount input by the operator to the operation lever of the master device 30. It is noted here that a pattern of change in a posture of each of an attachment, a leading end attachment, and an upper slewing body for each of the operation contents to be executed by the construction machine 50 is somewhat dependent on a machine type thereof. Therefore, each of the operation contents can be specified based on the information of the operational amount input by the operator to the operation lever. From this perspective, the database management part 15 may specify the operation content and the operation time period based on the information of the operational amount contained in the actual operation performance, and register the specified operation content and the operation time period in the actual operation performance database 17 of the operator.

As described above, provided in the embodiment is the system where the operator can do order acceptances for more operations after improving the skill level by increasing the trainings using the simulator 301 and passing more examinations in addition to the actual operation performance. Accordingly, the system can motivate the operator to improve his/her skill level by way of the simulator and the examinations using spare moments between actual operations with the aim of raising the overall skill level of the operator.

Figure 13:
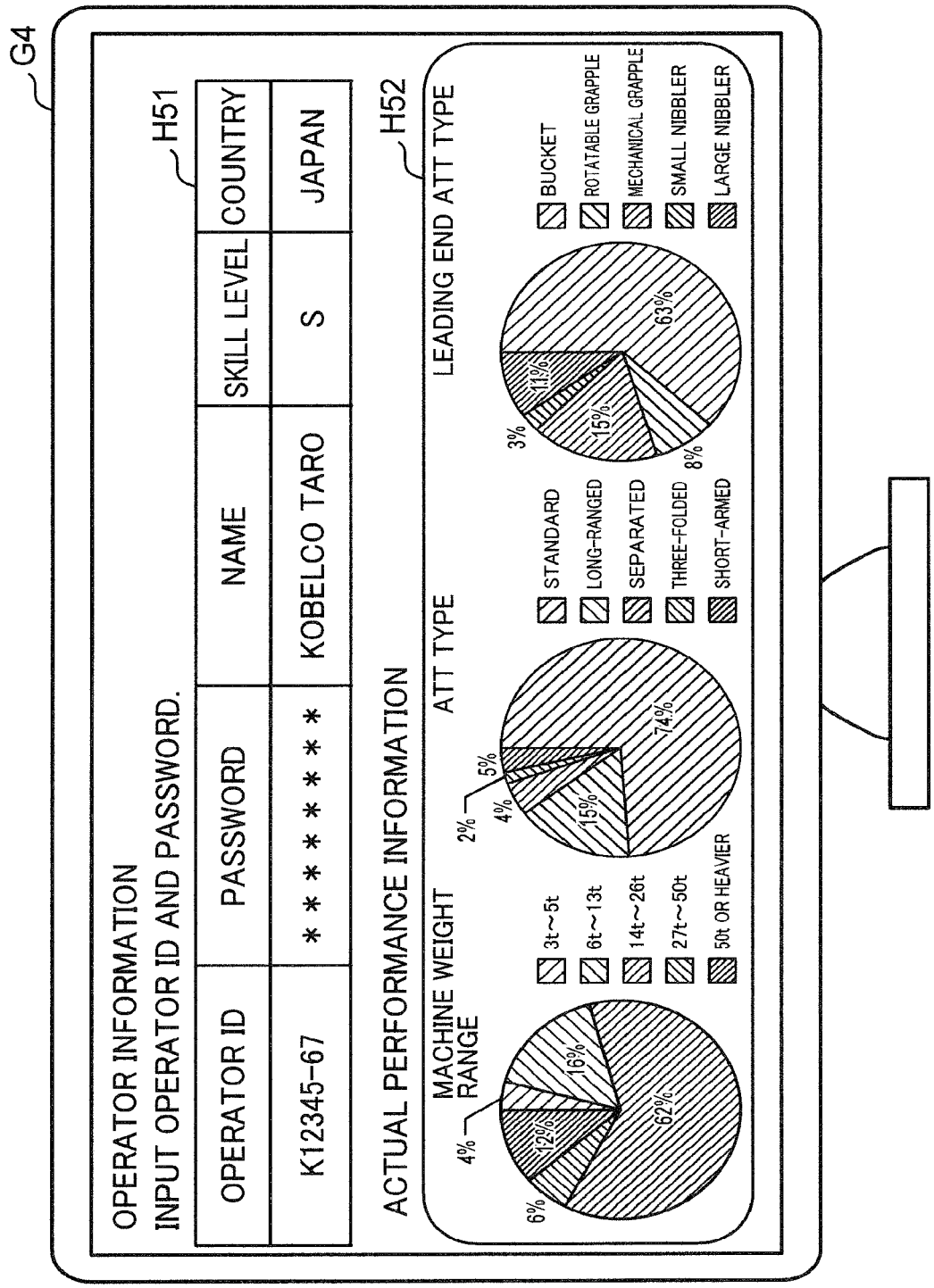
FIG. 13 shows an exemplary initial screen image to be displayed on a display part of the master device when the operator activates the master device.

FIG. 13 shows an exemplary initial screen image G4 to be displayed on the display part 306 of the master device 30 when the operator activates the master device 30. The initial screen image G4 includes a password input section H51 and an actual performance information section H52. The password input section H51 receives an input of personal information required for the operator to log in the operation selection system. Specifically, the password input section H51 includes columns of "OPERATOR ID", "PASSWORD", "NAME", "SKILL LEVEL", and "COUNTRY".

The column "OPERATOR ID" receives an input of an operator ID consisting of a sign string uniquely allotted to the operator. The column "PASSWORD" receives an input of a password set in advance to permit the operator to log in the master device 30. The column "NAME" represents the name of the operator. The column "SKILL LEVEL" represents the skill level of the operator. The column "COUNTRY" represents a name of a country where the operator lives. In FIG. 13, after the operator inputs the operator ID and the password and clicks an unillustrated login button, the communication part 305 of the master device 30 transmits the input operator ID and password to the server 10. The server 10 permits the login after confirming that a combination of the received operator ID and password matches one of the combinations of operator IDs and passwords registered in the operator table T1 (FIG. 7). After permitting the login, the server 10 sends to the master device 30 the information of the name, the skill level, and the country concerning the operator together with the data of the actual operation performance of the operator stored in the actual operation performance database 17.

The display control part 303 of the master device 30 displays the information of the name, the skill level, and the country sent from the server 10 in the corresponding columns of the password input section H51 and the like.

The display control part 303 of the master device 30 further generates a chart to be shown in the actual performance information section H52 in accordance with the actual operation performance sent from the server 10, and the actual performance information section H52 shows the generated chart.

The actual performance information section H52 shows each of the machine weight range, the ATT (attachment) type, and the leading end ATT type in accordance with the actual operation performance of the operator. The actual performance information section 1H52 shows three charts corresponding to the machine weight range, the ATT type, and the leading end ATT type. The three charts show respective breakdowns of the machine weight range, the ATT type, and the leading end attachment type concerning the actual operation performance of the operator.

Referring back to FIG. 1, the master device 30 includes the simulator 301, the examination execution part 302, the display control part 303, the operation part 304, the communication part 305, and the display part 306. The simulator 301 executes simulation for training the operator. The examination execution part 302 is activated for allowing the operator to take an examination.

The display control part 33 generates based on the display data received by the communication part 305 the display image G5 including the operation selection image G51 and the operation schedule image G52 shown in FIG. 6 so that the display part 306 displays the generated display image G5.

The operation part 304 includes an operative device such as a keyboard or a mouse, and receives a selection instruction of the operator that the operator selects a desired time segment of an operation time set for each of the operation contents in the operation selection image G51.

The communication part 305 (which is an exemplary "second communication part") includes a communicator which connects the master device 30 with the network NT1 and the communication channel NT2.

The display part 306 includes a display device such as a liquid crystal display and displays the display image G5 under the control of the display control part 303.

FIG. 14 is a flowchart showing a processing of an operation selection system according to the embodiment of the present invention. An operation part 203 of an orderer terminal 200 receives operation request information input by an orderer in step S101. In step S102, a control part 202 provides a communication part 204 with the operation request information received by the operation part 203, and the communication part 204 transmits the operation request information to a server 10. Here, various information input to an operation content input screen image G1 shown in FIG. 2 or an operation content input screen image G2 shown in FIG. 4 is sent as the operation request information.

A communication part 11 of the server 10 receives the operation request information in step S201. A display data generation part 12 causes the memory to store the operation request information received by the communication part 11 in step S202.

In step S301, an operation part 304 of a master device 30 receives authentication information (an operator ID and a password) input by the operator, and a communication part 305 transmits the authentication information to the server 10.

The communication part 11 of the server 10 receives the authentication information in step S203. At this time, the server 10 performs a login authentication by collating the authentication information with the information in an operator database 16. Step S204 and the subsequent steps are executed after the login authentication is confirmed. In the step S204, the display data generation part 12 of the server 10 generates based on the operation request information stored in the memory display data on which the master device 30 displays a display image G5 including an operation selection image G51 and an operation schedule image G52. In a case that the memory stores operation request information from a plurality of orderers, the display data generation part 12 may generate display data on which the master device 30 displays the display image G5 including operation selection images G51 respectively from the plurality of orderers. For instance, the display data is constituted by data in a markup language displayable on a web browser.

The communication part 11 of the server 10 transmits the display data to the master device 30 in step S205. The communication part 305 of the master device 30 receives the display data in step S302. In step S303, the display control part 303 of the master device 30 generates based on the display data received by communication part 305 the display image G5 so that the display part 306 displays the generated display image G5.

The operation part 304 receives a selection instruction of the operator having seen the display image G5 for a selection of a desired time segment of an operation time set in step S304. The communication part 305 transmits the selection instruction received by the operation part 304 to the server 10 in step S305.

The communication part 11 of the server 10 receives the selection instruction in step S206. An order acceptance management part 13 of the server 10 determines whether a skill level of the operator is equal to or higher than a required skill level for the desired time segment contained in the selection instruction in step S207.

In step S208, the order acceptance management part 13 provides the communication part 11 with an acceptance or refusal result for an order acceptance, and the communication part 11 transmits the acceptance or refusal result for the order acceptance to the master device 30. The acceptance or refusal result for the order acceptance includes, for example, data indicating whether to accept or refuse the order acceptance of the operator for the desired time segment.

The communication part 305 of the master device 30 receives the acceptance or refusal result for the order acceptance in step S306. The display control part 303 reflects the acceptance or refusal result for the order acceptance in the operation schedule image G52 in step S307.

According to the embodiment, the master device 30 displays the operation selection image G51 showing an operation content, a time segment, and a remuneration in combination with one another in response to an input of these information by the orderer. In this way, the operator can see the displayed operation selection image G51. Meanwhile, the operation selection image G51 includes the column "SELECTED TIME SET" displayed to allow a section of a desired time segment of an operation time set. Accordingly, the operator can make an operation schedule by a selection of a desired time segment at his/her convenience, and thus have an increased permissible range of selectivity in selecting an operation.

The present invention can adopt the following modifications.

(1) Although described in the embodiment is the required skill level input by the orderer, the present invention should not be limited thereto. For example, after an orderer performs an input of an operation time set to the operation content input screen image G1, a required skill level may be automatically determined in accordance with an operation time set for each of the operation contents.

For details, after the orderer performs the input of the operation time set for each of the operation contents, the orderer terminal 200 sends the input information to the server 10. The display data generation part 12 of the server 10 may calculate the required skill level for each of the operation contents so that the required skill level is higher for a larger operation time set contained in the received information. In this case, the display data generation part 12 may maintain the calculated required skill level under the lump order acceptance for the operation content, and lower the calculated required skill level by one rank under the partial acceptance for the operation content.

Further, the display data generation part 12 may provide the communication part 11 with the required skill level determined for each of the operation contents, and the communication part 11 may transmit the required skill level to the orderer terminal 200 so that the required skill level input section H2 and the operation schedule input section 113 show the required skill level.

(2) The operation selection image G51 may exclude an operation time set for a specific operation content whose required skill levels under a lump order acceptance and a partial order acceptance are both higher than the skill level of the operator without displaying the same. Alternatively, in the case that the required skill levels under the lump order acceptance and the partial order acceptance for the operation content are higher than the skill level of the operator, the operation schedule image may avoid reflecting a selection of a desired time segment of an operation time set for the operation content by the operator. In another case that the required skill under one of the lump order acceptance and the partial order acceptance for the operation content is higher than the skill level of the operator, the one of the order acceptances is displayed while the other of the order acceptances is not displayed.

(3) The rank determination table T3 shown in FIG. 3 defines five ranks, but may define four or fewer ranks, or six or more ranks instead.

Summarization of the Embodiment

The technical features of the embodiment are summarized in the following manner.

An operation selection system according to one aspect of the invention includes a remote manipulating device for remotely manipulating a construction machine; an orderer terminal for permitting an orderer to place an operation order to an operator of the remote manipulating device; and a server communicatively connected with the remote manipulating device and the orderer terminal, wherein the server includes: a first communication part which receives from the orderer terminal operation request information input by the orderer and including a specific operation content and an operation time set for the specific operation content; and a display data generation part which generates based on the operation request information display data on which the remote manipulating device displays an operation selection image showing the operation content and the operation time set in combination with each other to allow a selection of a desired time segment of the operation time set, and transmits the generated display data to the remote manipulating device via the first communication part, and the remote manipulating device includes: a second communication part which receives the display data; a display control part which generates the operation selection image based on the display data so that a display part displays the operation selection image; and an operation part which receives a selection instruction that the operator selects the desired time segment of the operation time set shown in the operation selection image, the second communication part being configured to transmit the selection instruction to the server, wherein the server further includes an order acceptance management part which receives an order acceptance of the operator for the desired time segment for the specific operation content indicated by the selection instruction.

According to this configuration, the remote manipulating device displays the operation selection image showing the operation content and the operation time set in combination with each other in response to the input of these information by the orderer. In this way, the operator can see the operation selection image. The operation selection image is displayed to allow a selection of a desired time segment of the operation time set. Accordingly, the operator can make an operation schedule by a selection of a desired time segment at his/her convenience, and thus have an increased permissible range of selectivity in selecting an operation.

In this configuration, it is preferable that the operation request information further includes a first remuneration for a lump order acceptance for an entirety of the operation time set, and a second remuneration for a partial order acceptance for a part of the operation time set and being lower than the first remuneration, and the operation selection image shows the first remuneration and the second remuneration in connection with the specific operation content.

According to this configuration, a higher remuneration is obtainable for the lump order acceptance for the entirety of the operation time set than for the partial order acceptance for a part of the operation time set, and hence it is possible to motivate the operator to choose the lump order acceptance. In this case, such a lump order acceptance of the operation content for the entirety of the operation time set by the operator alone is convenient for the orderer in terms of a reduction in the burden of operation schedule management. In contrast, the partial order acceptance for a part of the operation time set allows the operator to select a desired time segment for the operation at his/her convenience even though the remuneration for the partial order acceptance is lower than that for the lump order acceptance.

In this configuration, it is preferable that the operation request information further includes a first required skill level required for an operator who does the lump order acceptance for the entirety of the operation time set, and a second required skill level required for an operator who does the partial order acceptance for a part of the operation time set, the server further includes an operator database which stores respective skill levels of a plurality of operators, and the order acceptance management part acquires from the operator database the skill level of an operator having sent the selection instruction among the plurality of the operators when the first communication part receives the selection instruction, and accepts the order acceptance of the operator satisfying the condition of skill level equal to or higher than the first required skill level in the case that the selection instruction indicates the lump order acceptance, and of the operator satisfying the condition of skill level equal to or higher than the second required skill level in the case that the selection instruction indicates the partial order acceptance.

According to this configuration, the orderer can determine a required skill level (the first required skill level) under the lump order acceptance and another required skill level (the second required skill level) under the partial order acceptance depending on the operation content ordered by the orderer, and allows the operator having the skill level which is equal to or higher than at least one of the required skill levels to do the corresponding order acceptance.

In this configuration, the operation selection image preferably shows the first required skill level and the second required skill level each in connection with the specific operation content.

According to this configuration, the first and second required skill levels are shown in connection with the operation content. Hence, the operator can easily decide whether to choose the lump order acceptance or the partial order acceptance by collating each of the first and second required skill levels with his/her own skill level.

In this configuration, the display control part preferably permits an operation schedule image and the operation selection image to be displayed on a common screen, the operation schedule image showing the time segment selected by the operator and the specific operation content in combination with each other.

According to this configuration, the operation schedule image reflects the time segment selected by the operator in the operation selection image. Thus, the operator can easily confirm the selected time segment.

In this configuration, it is preferable that a first orderer and a second orderer are included as the orderer, a first orderer terminal for placing the operation order and a second orderer terminal for placing another operation order are included as the orderer terminal, first operation request information sent from the first orderer terminal and second operation request information sent from the second orderer terminal are included as the operation request information, a first operation selection image generated based on the first operation request information and a second selection image generated based on the second operation request information are included as the operation selection image, and the display control part permits the first operation selection image and the second operation selection image to be displayed on a common screen.

According to this configuration, the first operation selection image from the first orderer and the second operation selection image from the second orderer are displayed on the common screen of the display part. Hence, the operator can easily make an operation schedule by a selection of a desired time segment for an operation ordered by the first orderer, and a further selection of another desired time segment for another operation ordered by the second orderer.

In this configuration, it is preferable that a first operation content and a second operation content different from the first operation content are included as the operation content, a first operation time set for the first operation content, and a second operation time set for the second operation content are included as the operation time set, and the operation selection image shows the first operation content and the first operation time set in combination with each other, and the second operation content and the second operation time set in combination with each other, and each of the first operation time set and the second operation time set is displayed for a selection of a desired time segment.

According to this configuration, the operation selection image shows the first operation content and the first operation time set in combination with each other, and the second operation content and the second operation time set in combination with each other. The operator therefore can make an operation schedule by a selection of a desired time segment as a part of the operation time set for the first operation content, and another selection of another desired time segment as a part of the operation time set for the second operation content.

In this configuration, it is preferable that the operation request information includes a plurality of parameters concerning a specification of the construction machine, the operator database stores the skill levels in correspondence to a plurality of groups each consisting of different parameters of the plurality of parameters, and the order acceptance management part acquires from the operator database a skill level for one of the plurality of the groups of parameters contained in the operation request information when the first communication part receives the selection instruction, and accepts the order acceptance of the operator for the desired time segment indicated by the selection instruction in the case that the operator satisfies the condition of skill level equal to or higher than the first required skill level under the lump order acceptance indicated by the selection instruction, and in the case that the operator satisfies the condition of skill level equal to or higher than the second required skill level under the partial order acceptance indicated by the selection instruction.

According to this configuration, an operator having a skill level equal to or higher than the required skill level concerning the specification of the construction machine for use in the ordered operation is allowed to do an order acceptance for the operation.

The invention claimed is:

1. An operation selection system, comprising:
a remote manipulating device for remotely manipulating a construction machine;
an orderer terminal for permitting an orderer to place an operation order to an operator of the remote manipulating device; and
a server communicatively connected with the remote manipulating device and the orderer terminal, wherein the server includes:
a first communication part which receives from the orderer terminal operation request information input by the orderer and including a specific operation content and an operation time set for the specific operation content; and
a display data generation part which generates based on the operation request information display data on which the remote manipulating device displays an operation selection image showing the operation content and the operation time set in combination with each other to allow a selection of a desired time segment of the operation time set, and transmits the generated display data to the remote manipulating device via the first communication part, and
the remote manipulating device includes:
a second communication part which receives the display data;
a display control part which generates the operation selection image based on the display data so that a display part displays the operation selection image; and
an operation part which receives a selection instruction that the operator selects the desired time segment of the operation time set shown in the operation selection image, the second communication part being configured to transmit the selection instruction to the server, wherein
the server further includes an order acceptance management part which receives an order acceptance of the operator for the desired time segment for the specific operation content indicated by the selection instruction.

2. The operation selection system according to claim 1, wherein the operation request information further includes a first remuneration for a lump order acceptance for an entirety of the operation time set, and a second remuneration for a partial order acceptance for a part of the operation time set and being lower than the first remuneration, and
the operation selection image shows the first remuneration and the second remuneration in connection with the specific operation content.

3. The operation selection system according to claim 2, wherein
the operation request information further includes a first required skill level required for an operator who does the lump order acceptance for the entirety of the operation time set, and a second required skill level required for an operator who does the partial order acceptance for a part of the operation time set,
the server further includes an operator database which stores respective skill levels of a plurality of operators, and
the order acceptance management part acquires from the operator database the skill level of an operator having sent the selection instruction among the plurality of the operators when the first communication part receives the selection instruction, and accepts the order acceptance of the operator satisfying the condition of skill level equal to or higher than the first required skill level in the case that the selection instruction indicates the lump order acceptance, and of the operator satisfying the condition of skill level equal to or higher than the second required skill level in the case that the selection instruction indicates the partial order acceptance.

4. The operation selection system according to claim 3, wherein the operation selection image shows the first required skill level and the second required skill level each in connection with the specific operation content.

5. The operation selection system according to claim 1, Wherein
the display control part permits an operation schedule image and the operation selection image to be displayed on a common screen, the operation schedule image showing the time segment selected by the operator and the specific operation content in combination with each other.

6. The operation selection system according to claim 1, Wherein
a first orderer and a second orderer are included as the orderer,
a first orderer terminal for placing the operation order and a second orderer terminal for placing another operation order are included as the orderer terminal,
first operation request information sent from the first orderer terminal and second operation request information sent from the second orderer terminal are included as the operation request information,
a first operation selection image generated based on the first operation request information and a second selection image generated based on the second operation request information are included as the operation selection image, and
the display control part permits the first operation selection image and the second operation selection image to be displayed on a common screen.

7. The operation selection system according to claim 1, Wherein
a first operation content and a second operation content different from the first operation content are included as the operation content,
a first operation time set for the first operation content, and a second operation time set for the second operation content are included as the operation time set, and
the operation selection image shows the first operation content and the first operation time set in combination with each other, and the second operation content and the second operation time set in combination with each other, and
each of the first operation time set and the second operation time set are displayed for a selection of a desired time segment.

8. The operation selection system according to claim 3, Wherein
the operation request information includes a plurality of parameters concerning a specification of the construction machine, the operator database stores the skill levels in correspondence to a plurality of groups each consisting of different parameters of the plurality of parameters, and the order acceptance management part acquires from the operator database a skill level for one of the plurality of the groups of parameters contained in the operation request information when the first communication part receives the selection instruction, and accepts the order acceptance of the operator for the desired time segment indicated by the selection instruction in the case that the operator satisfies the condition of skill level equal to or higher than the first required skill level under the lump order acceptance indicated by the selection instruction, and in the case that the operator satisfies the condition of skill level equal to or higher than the second required skill level under the partial order acceptance indicated by the selection instruction.

9. An operation selection method for use in an operation selection system including: a remote manipulating device for remotely manipulating a construction machine; an orderer terminal for placing an operation order to an operator of the remote manipulating device; and a server communicatively connected with the remote manipulating device and the orderer terminal, the operation selection method comprising:

acquiring operation request information input by the orderer and including a specific operation content and an operation time set for the specific operation content;

causing the remote manipulating device to display based on the operation request information an operation selection image showing the specific operation content and the operation time set in combination with each other to allow a selection of a desired time segment of the operation time set;

acquiring a selection instruction that the operator selects the desired time segment of the operation time set shown in the operation selection image; and receiving an order acceptance of the operator for the desired time segment for the specific operation content indicated by the selection instruction.

\* \* \* \* \*